United States Patent
Klaas et al.

(10) Patent No.: US 12,324,419 B2
(45) Date of Patent: Jun. 10, 2025

(54) METHOD AND CONTROL ARRANGEMENT FOR CONTROLLING AN AUTOMATED CROWD GATE

(71) Applicant: DELAVAL HOLDING AB, Tumba (SE)

(72) Inventors: Ilka Klaas, Tumba (SE); Anders Umegård, Tumba (SE)

(73) Assignee: DeLaval Holding AB, Tumba (SE)

( * ) Notice: Subject to any disclaimer, the term of this patent is extended or adjusted under 35 U.S.C. 154(b) by 283 days.

(21) Appl. No.: 17/612,106

(22) PCT Filed: May 13, 2020

(86) PCT No.: PCT/SE2020/050489
§ 371 (c)(1),
(2) Date: Nov. 17, 2021

(87) PCT Pub. No.: WO2020/236066
PCT Pub. Date: Nov. 26, 2020

(65) Prior Publication Data
US 2022/0251896 A1   Aug. 11, 2022

(30) Foreign Application Priority Data
May 17, 2019 (SE) .................................. 1950591-6

(51) Int. Cl.
*A01K 29/00* (2006.01)
*A01K 1/00* (2006.01)

(52) U.S. Cl.
CPC .......... *A01K 29/005* (2013.01); *A01K 1/0023* (2013.01)

(58) Field of Classification Search
CPC .................................................. A01K 1/0029
See application file for complete search history.

(56) References Cited

U.S. PATENT DOCUMENTS

| 3,799,115 A * | 3/1974 | Fullerton | A01K 1/0029 |
| | | | 119/843 |
| 6,341,582 B1 * | 1/2002 | Gompper | A01K 1/0023 |
| | | | 119/840 |

(Continued)

FOREIGN PATENT DOCUMENTS

| EP | 0 567 191 | 10/1993 |
| EP | 2 437 593 | 4/2012 |

(Continued)

OTHER PUBLICATIONS

"Active vs. Passive RFID tags" available through comparesoft.com https://comparesoft.com/assets-tracking-software/rfid-asset-tracking/active-rfid-vs-passive-rfid-tags/ (Year: 2024).*

(Continued)

*Primary Examiner* — Christopher D Hutchens
*Assistant Examiner* — Nevena Aleksic
(74) *Attorney, Agent, or Firm* — NIXON & VANDERHYE

(57) ABSTRACT

A method and control arrangement for controlling an automated crowd gate that operates to form a side of a holding area and moves in relation to an entrance of a destination in order to cause animals located in the holding area to move towards the destination, wherein location data defining individual positions of one or more animals located in the holding area is obtained from a real-time location system, location data, a current position of the crowd gate is obtained, and an operation of the crowd gate is controlled based on the obtained position of the crowd gate and the obtained location data of the animals.

33 Claims, 5 Drawing Sheets

(56) References Cited

U.S. PATENT DOCUMENTS

| | | | |
|---|---|---|---|
| 10,281,889 B2 | 5/2019 | Alqarni et al. | |
| 10,327,416 B1* | 6/2019 | Studebaker, Jr. | A01K 1/0029 |
| 2008/0314325 A1* | 12/2008 | Hempstead | A01K 1/0023 |
| | | | 119/51.02 |
| 2010/0107985 A1* | 5/2010 | O'Hare | A01K 29/005 |
| | | | 119/174 |
| 2011/0023795 A1* | 2/2011 | Huls | A01K 1/0023 |
| | | | 119/843 |
| 2011/0192356 A1* | 8/2011 | Loosveld | A01K 1/0023 |
| | | | 49/31 |
| 2011/0308465 A1* | 12/2011 | Siddell | A01K 1/12 |
| | | | 119/14.08 |
| 2012/0234245 A1* | 9/2012 | Rajkondawar | A01K 1/12 |
| | | | 119/14.18 |
| 2016/0192612 A1 | 7/2016 | Siddell | |
| 2017/0006838 A1* | 1/2017 | Brayer | G05B 19/4155 |
| 2022/0061260 A1* | 3/2022 | Gross | A01K 1/0023 |

FOREIGN PATENT DOCUMENTS

| | | | |
|---|---|---|---|
| EP | 3 138 393 | 3/2017 | |
| LU | 100252 | 1/2019 | |
| WO | 2010/139602 | 12/2010 | |
| WO | WO-2010139602 A2 * | 12/2010 | A01K 1/0029 |
| WO | 2011/154949 | 12/2011 | |
| WO | 2014/067897 | 5/2014 | |
| WO | 2015/145422 | 10/2015 | |

OTHER PUBLICATIONS

Search Report for SE Application No. 1950591-6 dated May 17, 2019, 3 pages.
International Search Report for PCT/SE2020/050489 dated Jun. 25, 2020, 5 pages.
Written Opinion of the ISA for PCT/SE2020/050489 dated Jun. 25, 2020, 6 pages.

* cited by examiner

METHOD AND CONTROL ARRANGEMENT FOR CONTROLLING AN AUTOMATED CROWD GATE

TECHNICAL FIELD

The present disclosure generally relates to the field of farming and more specifically it relates to a method and a control arrangement for controlling a moveable crowd gate.

BACKGROUND

In an agricultural environment where milk is extracted from animals, such as on a dairy farm, the animals may be kept in a holding area, before they are allowed to enter a milking parlour where the animals are milked. The holding area may sometimes have a moveable crowd gate for encouraging the animals to move within the holding area, towards the milking parlour in order to get milked, so that the milking operations (parlour filling time) proceed as smoothly as possible. The crowd gate is often used in combination with a "bell" that sounds before or while the crowd gate moves.

One challenge today is that crowd gates are generally manually or semi-manually operated, which means that it is difficult to obtain a consistent flow of animals into the milking parlour entrance. Also, crowd gates are sometimes operated from remote distance, by a person who does not have a complete overview, meaning that sometimes the crowd gate can be activated even though the animals that it pushes are prevented from moving forward because there are too many other animals blocking their way. Such operation associated with the crowd gate may cause unnecessary stress levels to the animals. It may even be a potential risk for farm employees, who may be hit by the moving gate (if not by the gate so by being squeezed or trampled by the animals), as well as to the animals in the holding area.

It would for these reasons be desirable to find a way to better control the crowd gate, giving the animals sufficient space while still ensuring a consistent animal flow towards the milking parlour entrance.

SUMMARY

It is an object of the disclosure to alleviate at least some of the drawbacks with the prior art. Thus, it is an object to provide a method for operating a crowd gate that does not stress the animals, but still ensures a consistent animal flow towards a destination.

According to a first aspect, the disclosure relates to a method for controlling an automated crowd gate operable to form a side of a holding area and to move in relation to an entrance of a destination, in order to cause animals located in the holding area to move towards the destination. The method comprises obtaining, from a real-time location system, RTLS, location data defining individual positions of one or more animals located in the holding area, obtaining a current position of the crowd gate, and controlling an operation associated with the crowd gate, based on the obtained position of the crowd gate and the location data. By using location data from a RTLS it is possible to get a desired flow of animals through the entrance to the destination, as the current location of individual animals in the holding area may be considered when controlling the operation.

In some embodiments, the controlling comprises controlling a movement of the crowd gate and/or controlling transmission of a warning signal that is perceivable to one or more of the animals in the holding area. Hence, the location data may be used to control the operation associated with the crowd gate in different ways, in order to improve the flow of animals through the entrance to the destination.

In some embodiments, the controlling comprises controlling a speed or a speed pattern of the movement of the crowd gate. Thereby, the speed may be adopted to be optimised based on different situations, for example based on where in the holding area the animals are located.

In some embodiments, the location data comprises at least one of level of stationarity, movement, acceleration and direction of movement of the one or more individual animals. Hence, different types of data may be used to make the control of the operation even more adapted to, for example, the specific situation and the animal's behaviour.

In some embodiments, the method comprises determining, based on the location data, a count of animals located within a distance of the entrance and the controlling comprises controlling the operation based on the determined count of animals located within a distance of the entrance. By analysing how many animals are queuing at the entrance, the crowd gate may be controlled to strive at making sure that there are always a certain animals ready to enter the destination.

In some embodiments, the method comprises determining, based on the location data, a count of animals located within a distance of the crowd gate and the controlling comprises controlling the operation based on the determined count of animals located within a distance of the crowd gate. Thereby, it is possible to for example move the crowd gate more gently, if there are many animals that need to move forward. Hence, stress and potential injuries among the animals may be avoided.

In some embodiments, the controlling comprises reducing, reversing or stopping the movement of the crowd gate upon determining, using the real-time location system, presence of a human, or an animal having a certain level of stationarity, in the holding area or within a distance of the crowd gate. Thus, if there is a person right in front of the crowd gate, the crowd gate is in these embodiments controlled to not move at all, in order to avoid hitting the person. The same applies if an animal is lying down right in front of the crowd gate.

In some embodiments, the controlling comprises controlling transmission of the warning signal such that, before an animal is hit by the crowd gate, a warning signal perceivable to the animal is transmitted. This may decrease stress, as the animals will always be warned before they are hit. On the other hand, if no animals are in the way, no warning signal is transmitted, which makes the wait before milking even more quiet and peaceful.

In some embodiments, the method comprises determining, based on the location data, a distribution of animals within the holding area and/or a density of animals within a part of the holding area, and the controlling comprises controlling the operation associated with the crowd gate based on the determined distribution or density. Thereby, the movement of the crowd gate may be adapted based on the density (i.e. no. animals per a certain area unit) for example right in front of the crowd gate, which makes it possible to avoid for example situations where the crowd gate tries to push animals that cannot move as they are hindered by other animals.

In some embodiments, the controlling comprises controlling the crowd gate to move with a lower speed if the determined density of animals in a part of the holding area is above a first value, than if it being below the first density value. Thereby, the animals are less stressed if the holding area is crowded so that it may be difficult for the animals to move, but the animals are on the other hand moved in an efficient way if there is a lot of space.

In some embodiments, the controlling comprises refraining from moving the crowd gate upon the determined density in a part of the holding area meeting a second density value. Thus, if the holding area, or a part of it, is very crowded it may be better not to move the crowd gate at all.

In some embodiments, the controlling comprises operating the crowd gate such that there is always a certain count of animals within a distance of the entrance. Thereby, a constant flow of animals to the destination may be assured.

In some embodiments, the method comprises determining, based on the location data, a movement of one or more of the animals in the holding area, and the controlling comprises controlling the operation associated with the crowd gate based on the determined movement. Thus, the crowd gate may be operated based on whether the animals move or act in a desired manner. If they do, it is typically desirable to disturb them as little as possible. Hence, the crowd gate should typically not hit any animal and the warning signal does not need to be transmitted.

In some embodiments, the controlling comprises operating the crowd gate to a default position upon determining, based on the location data, that the count of the animals in the holding area is below a threshold. Thus, when all (or most of) the animals have entered the destination, the crowd gate may move back to let in more animals.

In some embodiments, the controlling comprises ceasing to transmit the warning signal upon the determined movement corresponding to a desired movement. Thereby, the animals are not disturbed when not required, which makes the process of moving them more relaxed.

In some embodiments, the warning signal is at least one of a visible signal, an audio signal, a vibration signal, an electrical signal or a tactile signal. Thus, different types of warning signals may be used, or different combinations of warning signals may be used.

In some embodiments, the controlling comprises controlling the operation associated with the crowd gate using one or more rules, which are configurable, settable or predefined. Thereby, the farmer may choose to adapt the rules to a certain population of animals, or a default value may be used.

According to a second aspect, the disclosure relates to a control arrangement configured to control operation of a crowd gate, the control arrangement being configured to perform the method according to any embodiment of the first aspect.

According to a third aspect, the disclosure relates to a computer program comprising instructions which, when the program is executed by a computer, cause the computer to carry out the method according to the first aspect.

According to a fourth aspect, the disclosure relates to a computer-readable medium comprising instructions which, when executed by a computer, cause the computer to carry out the method according to the first aspect.

DETAILED DESCRIPTION

As livestock systems (for example dairy, beef, sheep and pigs) become more intensive, producers typically need to manage livestock on a larger scale, while labour availability, skill and resources are often limited. For this purpose, many farms use Real-Time Location Systems, RTLS. For example, patent application US2010107985 A1 discloses an animal monitoring system, comprising an RTLS for individually identifying and tracking the movements of tagged animals in three dimensions within a monitoring zone.

This disclosure is based on the insight that location data provided by a RTLS may also be used to control operation of a crowd gate. More specifically, it is herein proposed to let a control system of a crowd gate, based on location data provided by an RTLS, find out the positions of individual animals that are in the holding area and use it for controlling operation associated with the crowd gate. By also knowing the position of the crowd gate, the information from the RTLS may be used to control the operation associated with the crowd gate in an efficient way. The location data may also in some embodiments comprise information regarding if and how the individual animals move, which may also be useful when deciding how to operate the crowd gate. The principles of controlling a crowd gate based on location data obtained from an RTLS will now be described with reference to the figures.

Figure 1:
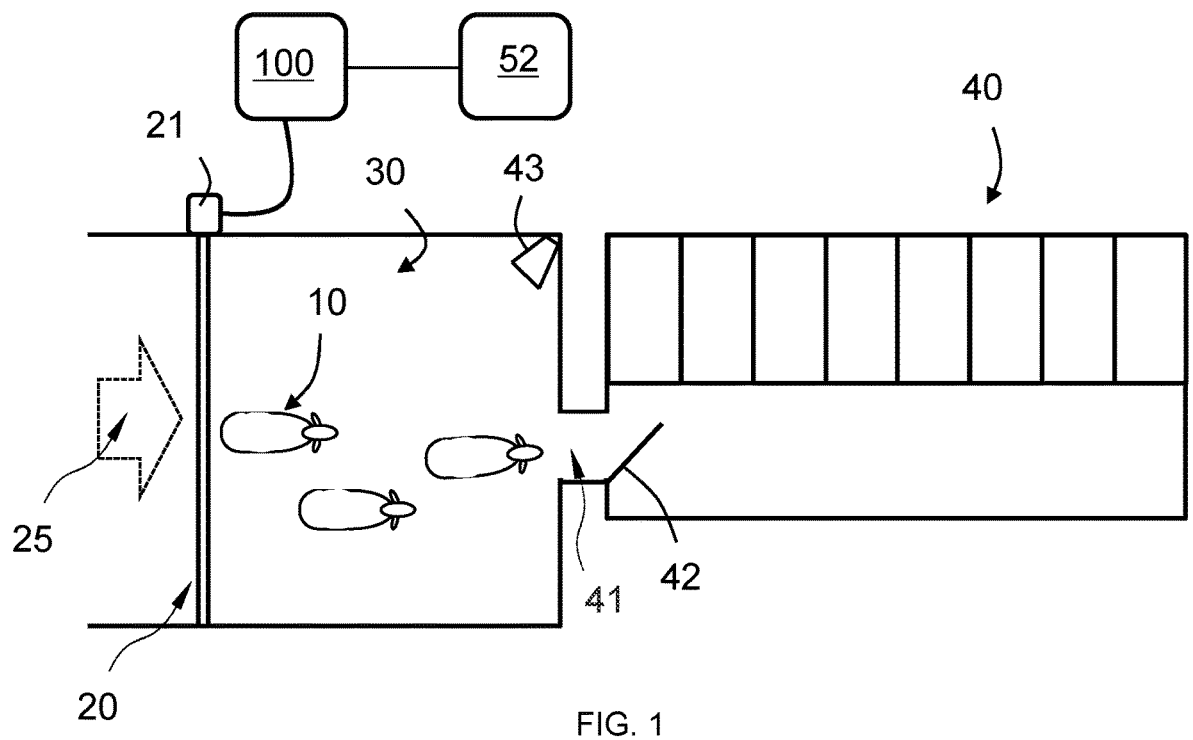
FIG. 1 illustrates an example of a milking parlour and a holding area leading thereto.

FIG. 1 illustrates a schematic scenario of a farm, seen from above. The farm comprises a destination 40, here embodied as a milking parlour, and a holding area 30 with an entrance 41 and gate 42 in-between. The holding area 30 (sometimes also be referred to as waiting area, holding pen, etc.) is used to hold animals waiting to be milked. A group of animals 10 is allowed to enter the holding area 30 through an entrance (not shown). The milking parlour may comprise any type of batch milking system, such as a conventional parlour, a number of milking robots, a rotary milking platform, etc. Typically, a predetermined number of animals 10 may be allowed to enter the holding area 30 where after the entrance to the holding area 30 is closed.

The animals 10 may be any arbitrary type of animal such as for example a domesticated animal. However, the herein provided non-limiting examples primarily relate to non-human milk and/or meat producing animals such as cow, goat, sheep, camel, dairy buffalo, yak, etc.

The size of the holding area 30 may be adjusted by means of a moveable crowd gate 20 arranged to form one side of the holding area 30. The crowd gate 20 is operable to selectively move towards and away from the entrance 41 of the destination 40. When the crowd gate 20 is moved towards the entrance 41 of the destination 40, the size of the holding area 30 is decreased and when the crowd gate 20 is moved away from the entrance 41 of the destination 40, the size of the holding area 30 is increased. The moveable crowd gate 20 may move in relation to the entrance 41 along an axis substantially parallel to two other sides of the holding area 30 and may for example rest on rails along the walls, floor or ceiling of the holding area 30. However, the moveable crowd gate 20 may alternatively be supported by wheels running on the floor, or in any other feasible manner. The moveable crowd gate 20 may in some alternative embodiments be arranged on an autonomous vehicle, configured to guide the animals 10 towards the entrance 41 to the destination 40.

An actuator 21, such as an electrical/ pneumatic/ hydraulic/ engine, may be arranged to cause the moveable crowd gate 20 to move from a starting position (as illustrated in FIG. 1) in a first direction 25 towards the entrance 41 of the destination 40. The animals 10 are thereby encouraged to enter the destination 40 through the entrance 41. Operations associated with the crowd gate 20 are controlled by a control unit 100, based on data received from a RTLS 50, as will be further explained in conjunction with presentation of the proposed method (FIG. 3) and the illustrative scenarios of FIGS. 4 to 8. The actuator 21 may be distinct from the control unit 100 but may receive commands from the control unit 100 via a wired or wireless communication interface.

In some embodiment, a warning arrangement 43 is arranged at the crowd gate 20 for encouraging the animals 10 to move towards the entrance 41 of the destination 40. The warning arrangement 43 comprises for example one or more bells, speakers, vibrators or light sources. The warning arrangement 43 is configured to transmit a warning signal perceivable to one or more of the animals 10 in the holding area 30.

The warning signal is for example a visible signal, an audio signal, a vibration signal, an electrical signal or a tactile signal. In some embodiments, the warning arrangement 43 is arranged such that the warning signal may be directed towards one or more of the animals 10. In some embodiments the warning signal is transmitted using a tag 51 (FIG. 2) of the RTLS 50. For example, the tags 51 may be configured to generate the warning signal (for example a sound signal, a vibration or a tactile signal) perceivable in particular to the animal 10 wearing it. The warning arrangement 43 may be distinct from the control unit 100 but may receive commands from the control unit 100 via a wired or wireless communication interface.

The moveable crowd gate 20 may in some embodiments, as a security measure, comprise a pressure sensor, proximity sensor or the like, arranged on the crowd gate 20, which may serve as an emergency stop for the movements of the crowd gate 20 in case an animal 10 is in the way. The movement may be halted for a predetermined or configurable period of time. It may thereby be avoided that animals 10 get hurt by the crowd gate 20 or get stuck in the crowd gate 20. The emergency stop may trigger an emergency alarm, engaging the attention of the farmer.

Figure 2:
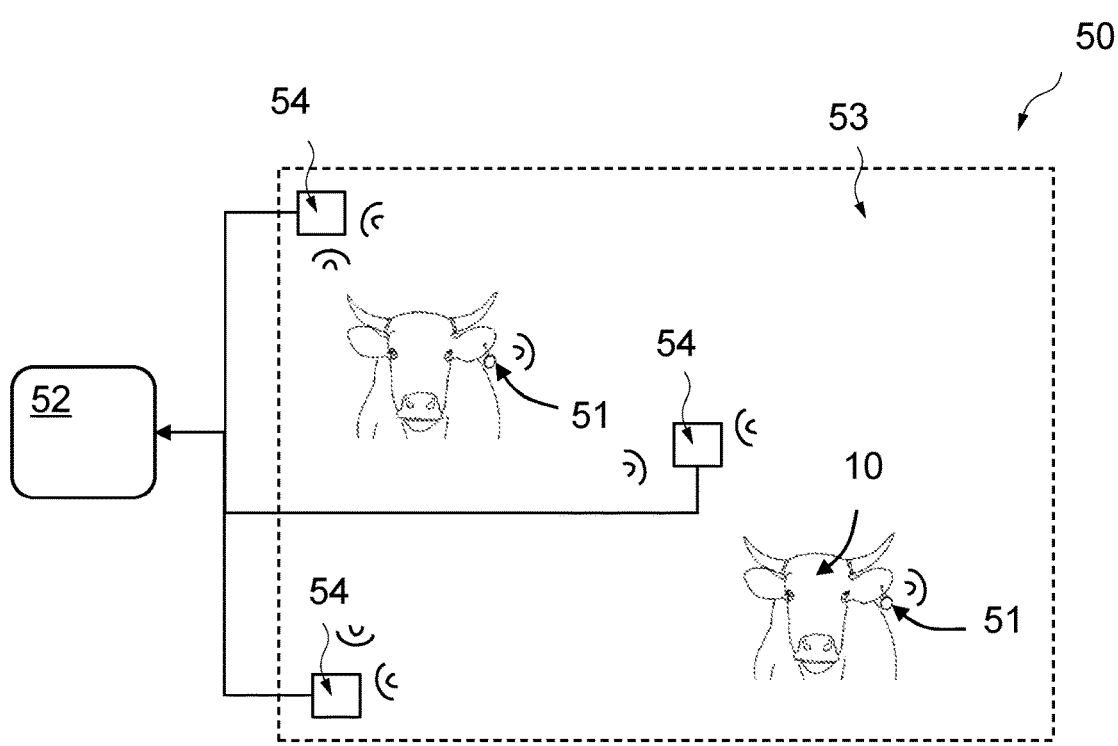
FIG. 2 illustrates an example real time location system.

FIG. 2 illustrates an example of a RTLS 50 that may be used by the proposed method and control unit 100. An RTLS 50 is a known type of system used to track the location of objects, such as animals 10, in real time using tags 51 (active or passive) attached to animals 10 and readers 54 that receive wireless signals from these tags 51 to determine their locations. The wireless communication includes, but is not limited to, a cellular radio, a WiFi radio, a Bluetooth radio, a Bluetooth low energy (BLE) radio, UltraWideBand (UWB) radio or any other appropriate radio frequency communication protocol. The particular number and placement of the readers 54 will depend on the size and shape of a tracking zone 53, for example a farm, being monitored.

In some embodiments the tags 51 also comprise orientation sensors configured to generate data indicative of the orientation of the sensor, such as a three-axis accelerometer assembly or a gyro assembly. The tags 51 may also include other sensors or components, such as object monitoring sensors. The object monitoring sensors may comprise a thermometer, a heart rate monitor, a vibration sensor, a camera, a microphone, or any other appropriate device.

When the RTLS 50 is in use, the location of each tag 51 is tracked within the tracking zone 53 using multi-lateration techniques known in the art, for example using Time Difference of Arrival (TDOA) and Received Signal Strength Indicator (RSSI) techniques. To this end, data from the readers 54 is supplied to a control system 52 that determines, in real-time basis, the instantaneous position of each tag 51 in the tracking zone 53. The control system 52 may be implemented as a computer-based system that is capable of executing computer applications (for example, software programs). An exemplary application of the control system 52 includes a real-time location function, configured to determine a two or three-dimensional position of the tag 51 within a tracking zone 53. The control system 52 may for example use triangulation of data provided by three or more readers 54 to determine the location of the tags 51.

In some embodiments, the control system 52 is configured to determine a movement of the tags 51, including for example direction of movement and amount of movement. In some embodiments, the control system 52 is configured to determine an orientation of the tag 51. In some embodiments, the control system 52 is configured to discriminate between different activities of an animal 10 wearing the tag 51 based upon the location, movement and orientation of the animal's tag within the monitoring zone. As an example, the level of stationarity may be determined, such as whether the animal is sleeping, lying down, resting, stagnant or active. The object monitoring function, any other applications and an operating system executed by the control system 52 may be stored on a non-transitory computer readable medium, such as a memory.

The control system 52 also may have one or more communications interfaces. The communications interfaces may include for example, a modem and/or a network interface card. The communications interfaces enable the control system 52 to send and receive data to and from other computing devices such as the control unit 100 configured to control the operation associated with the crowd gate 20. Also, the communications interface enables the control system 52 to receive messages and data from the readers 54 or directly from the tags 51 either directly or via another communications network. The communications network may be any network platform and may include multiple network platforms. Exemplary network platforms include, but are not limited to, a WiFi network, a cellular network, etc.

The proposed technique will now be described in further detail with reference to the flow chart of FIG. 3 and the farm of FIG. 1

Figure 3:
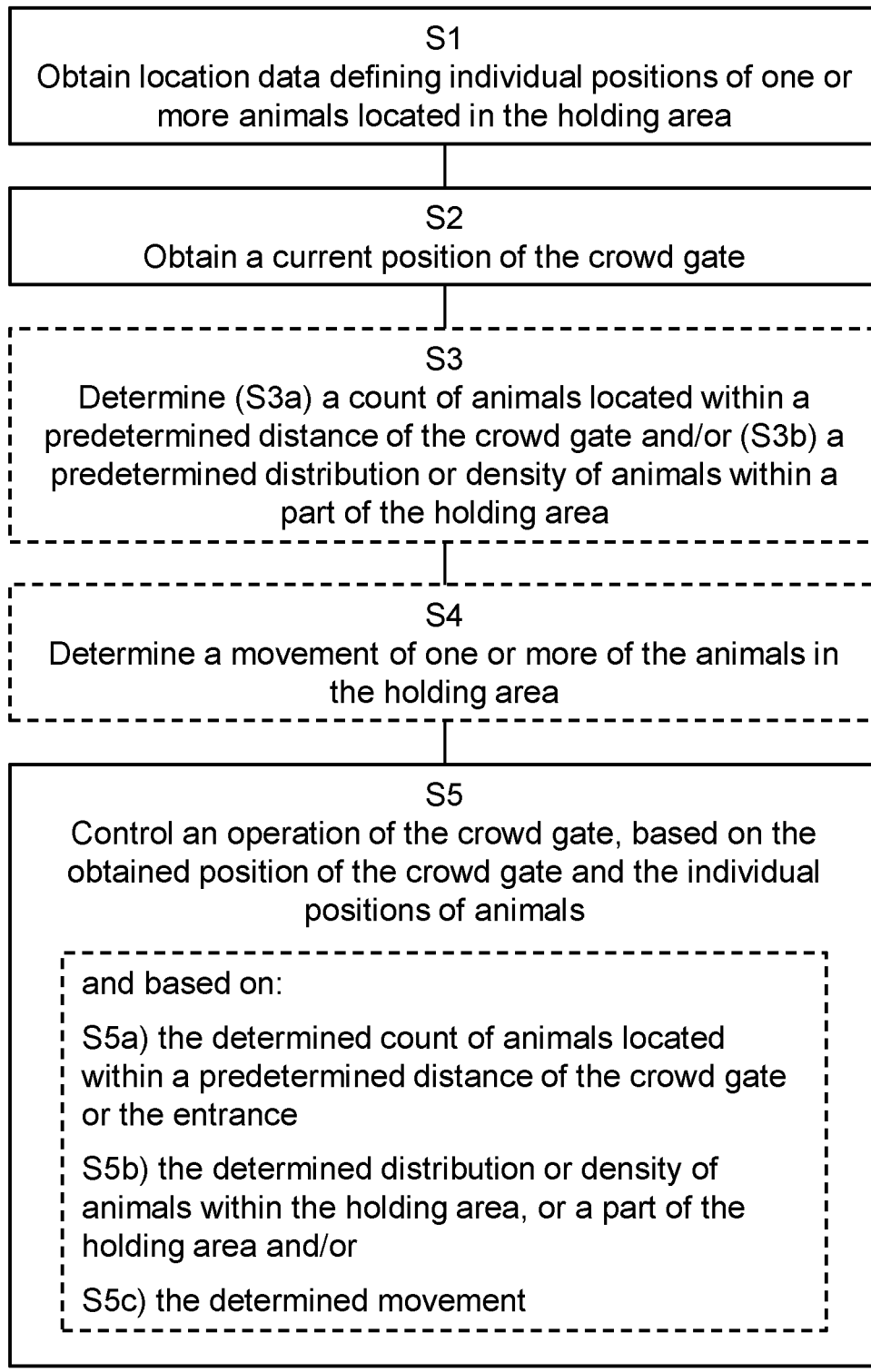
FIG. 3 is a flowchart of the proposed method for controlling an automated crowd gate according to the first aspect.

The flow chart in FIG. 3 illustrates the method for controlling an automated crowd gate 20 operable to form a side of a holding area 30 and to move in relation to an entrance 41 of a destination 40, in order to cause animals 10 located in the holding area 30 to move towards the destination 40. The method is typically performed when a group of animals 10 shall be moved to a destination 40, such as to a milking parlour for milking.

The method may be implemented as a computer program comprising instructions which, when the program is executed by a computer (for example a processor 101 in the control unit 100 (FIG. 9)), cause the control unit 100 to carry out the method. According to some embodiments the computer program is stored in a computer-readable medium (for example a memory or a compact disc) that comprises instructions which, when executed by a computer, cause the computer to carry out the method.

In order to control the operation of the moveable crowd gate 20, the method may comprise a number of steps S1-S5. However, some of these steps are optional, which is illustrated with dashed lines, and may be performed solely in some embodiments. Further, the described steps may be performed in a somewhat different chronological order than the numbering suggests.

The method comprises obtaining S1 location data from the RTLS 50. The location data defines individual positions of one or more animals 10 located in the holding area 30. In other words, information which is typically already available in the RTLS 50 is retrieved using a communication interface 103. The location data is typically continually or repetitively obtained S1 by the control unit 100. In some embodiments, the location data also comprises, in addition to the individual positions, at least one of level of stationarity, movement, acceleration and direction of movement of the one or more individual animals 10, as described above.

In addition to the location data, the position of the crowd gate 20 has to be known. In other words, the method further comprises obtaining S2 a current position of the crowd gate 20. In some embodiments, the current position of the crowd gate 20 is obtained using RTLS tag(s) attached to the crowd gate 20 (preferably two at the ends, or just one and then the dimensions of the crowd gate may be added to the system configuration for better accuracy). Alternatively, the position may be obtained by deducing the position of the crowd gate 20 using historic information, such as the running time or engine speed of the controlling motors. The position of the crowd gate 20 may also be obtained using other techniques, for example positioning techniques.

When the location of the individual animals 10 and the position of the crowd gate 20 are known, different parameters may be calculated. For example, the number of animals located in the holding area 30 may be determined.

Figure 4:
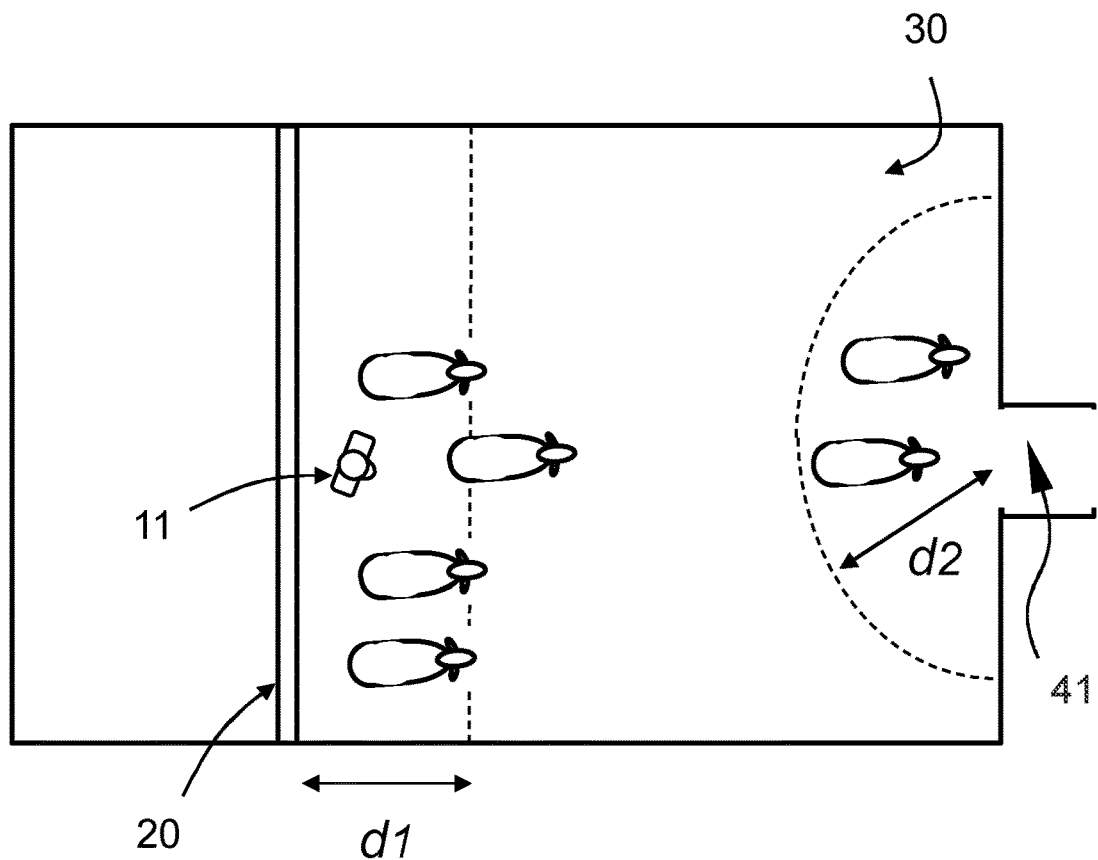
FIG. 4 illustrates a first example scenario where animals are located in a holding area with a moveable crowd gate.

As the position of each animal 10 is known, more advanced calculations may also be made. For example, it is possible to calculate if there are any animals 10 close (e.g. in a defined proximity) to the crowd gate 20 that may be injured if the crowd gate 20 moves. Also, it may be determined if there is a sufficient number of animals 10 close to the entrance 41, which implies that an even flow of animals 10 through the entrance 41 may be expected. In other words, in some embodiments, the method comprises determining S3a, based on the location data, a count of animals 10 located within a distance d1 (FIG. 4) of the crowd gate 20 and/or within a distance d2 (FIG. 4) of the entrance 41. Hence, the distances d1 defines an area in the holding area 30 right in front of the crowd gate 20, in the direction of the entrance 41, as shown in FIG. 4. In the same way, the distance d2 defines an area in the holding area 30 right in front of the entrance 41. The distances d1 and d2 are for example one or a few meters.

Also, the density of animals 10 in a part of the holding area 30, may be calculated. The certain part of the holding area is for example a specific area of the holding area or the entire holding area. In other words, the number of animals per area unit in the holding area 30, or in a certain part of it may be determined. Alternatively, the distribution of animals may be analysed. The distribution is basically the pattern formed by the positions of the individual animals 10 in the holding area 30. The distribution and density may be analysed to find out where in the holding area 30 the animals are located. The distribution or density may also provide information regarding if the animals 10 have enough space to move (if pushed) or if there is a risk that they are in the way of each other. In conclusion, in some embodiments, the method comprises determining S3b, based on the location data, a distribution of animals 10 within the holding area 30 and/or a density of animals within a part of the holding area 30.

The location data may also be used to determine how the animals move. For example, by studying the individual positions over time. Based on the location data it is possible to determine if and how an individual animal 10 moves. In addition, data provided by orientation sensors in the tags 10 may indicate the stationarity of a certain animal, such as if it lies down or has not moved for a while. A level of stationarity corresponds to a likelihood the animal will move (in the desired direction). An animal having a high level of stationarity (as it is facing away or lying down) is not likely to move soon. However, an animal who just took a few steps in a desired direction may be expected to move further soon. In other words, in some embodiments, the method comprises determining S4, based on the location data, a movement of one or more of the animals 10 in the holding area 30.

Hence, the location data may be analysed in a variety of ways in order to determine how to control the operation associated with the crowd gate 20 in an efficient manner. One or more rules may be defined to control the operation. These rules may be settable (for example in a user interface by a farmer), configurable (e.g. by software or at installation of the crowd gate 20) or predefined. For example, the farmer may set rules based on the personalities of the animals 10. For example, parameters such as the distances d1 and d2 or the density values mentioned above may be configured or predefined. In general, all parameters used to control the crowd gate 20 may be configurable, settable or predefined as suitable. More specifically, the method further comprises controlling S5 an operation associated with the crowd gate 20, based on the obtained position of the crowd gate 20 and the location data. The operation associated with the crowd gate is for example controlled by sending a control signal or control data to the actuator 21 or to the warning arrangement 43. The control signal or control data comprises information defining how to move the crowd gate 20 or how to transmit the warning signal. In some embodiments, the controlling S5 comprises controlling a movement of the crowd gate 20. For example, an acceleration, a speed or a speed pattern of the movement of the crowd gate 20 is controlled S5. In other words, the crowd gate may be controlled to move in different ways, for example fast or firmly (for example with constant speed) or with small pushes, depending on how the individual animals are positioned in the holding area 30.

The transmission of the warning signal may also be controlled in an efficient way based on the location data. For example, the warning signal may not be transmitted at all when not required in order to avoid stressing the animals. In some embodiments, the warning signal is directed only to those animals that needs to be warned or alerted. For example, if a tactile signal (such as a gentle vibration or tickling) is transmitted (for example using the tags 51) then the signal may only be transmitted to some of the animals 10. In other words, in some embodiments, the controlling S5 comprises controlling transmission of a warning signal that is perceivable to one or more of the animals 10 in the holding area 30. The warning signal is a visible signal, an audio signal, a vibration signal, an electrical signal or a tactile signal.

A plurality of different criteria may be defined and combined to control the operation associated with the crowd gate 20 based on the location data. For example, in some embodiments, the controlling S5 comprises controlling S5a the operation based on the determined count of animals 10 located within a distance d1 (FIG. 4) of the crowd gate 20. For example, if there are no animals 10 within the distance d1 the crowd gate 20 may be controlled to move with a higher speed.

For example, in some embodiments, the controlling S5 comprises controlling S5 the operation based on the determined count of animals 10 located within a distance d2 (FIG. 4) of the entrance 41. For example, if there are no animals 10 close to the entrance 41, then the crowd gate 20 may be controlled to try to force the animals 10 to move forward also using the warning signal.

Also, if a person is standing right in front of the crowd gate 20, in the direction of the entrance 41, then the crowd gate 20 should typically not move at all, at least not in that direction. The same goes if an animal 10 is lying down in the holding area 30. In other words, in some embodiments, the controlling S5 comprises reducing, reversing or stopping the movement of the crowd gate 20 upon determining, using the a real-time location system 50, presence of a human, or an animal 10 having a certain level of stationarity, in the holding area 30 or within a distance d1 of the crowd gate 20.

It may also be desirable to make sure that an animal 10 is always warned before it is hit by the crowd gate 20. A hit may be predicted as the position of the crowd gate and the position of the animal 10 is known from the location data. In some embodiments, the controlling S5 comprises controlling transmission of the warning signal such that, before an animal is hit by the crowd gate 20, a warning signal perceivable to the animal 10 is transmitted.

In some embodiments, the controlling comprises controlling S5b the operation associated with the crowd gate 20 based on the determined distribution or density. For example, the crowd gate should typically move slowly when there are many (above a certain threshold) animals 10 in a part of the holding area 30, as they may prevent each other from moving fast. In this way the animals 10 may be given time to reposition or to leave space for each other, while moving towards the destination 40. In other words, in some embodiments, the controlling S5 comprises controlling the crowd gate 20 to move with a lower speed if the determined density of animals is above a first value, than if it being below the first density value.

If the density is very high, it may be better not to move the crowd gate at all, until some more animals have entered the destination 40. In other words, in some embodiments, the controlling S5 comprises refraining from moving the crowd gate 20 upon the determined density meeting a second density value.

As the flow of animals through the entrance is typically of high importance, it may be important to assure that there are always one or more animals cueing right at the entrance 41. In other words, in some embodiments, the controlling S5 comprises operating the crowd gate 20 such that there is always a certain count of animals 10 within a distance d2 of the entrance 41.

Another way of controlling the operation associated with the crowd gate is to study how the animals 10 move. In general, if the animals are moving in a desired way or direction, moving the crowd gate 20 or transmitting the warning signal may only cause unnecessary stress. In other words, in some embodiments the controlling comprises controlling S5c the operation associated with the crowd gate 20 based on the determined movement. In some embodiments, the controlling S5 comprises ceasing S5 to transmit the warning signal upon the determined movement corresponding to a desired movement.

The location data may also be used to determine when all (or most of) the animals 10 have entered the destination 40. Hence, in some embodiments, the controlling S5 comprises operating the crowd gate 20 to a default position upon determining, based on the location data, that the count of the animals 10 in the holding area 30 is below a threshold. The default position is for example a reversed position. The default position is in some embodiments, an elevated position, which enables a new group of animals to enter the holding area 30 under the elevated crowd gate 20. Alternatively, animals may enter the holding area 30 from a specific entrance (not shown) of the holding area 30, which is available in the reverse position. In other words, when there are no animals in the holding area 30 (that is, all have entered the destination) it is controlled to automatically reverse to the start position and let a new group of animals 10 in. It is also possible to use the RTLS to deduce when the holding area 30 is filled and it is time to start a new push cycle, where a new group of animals shall be moved to the destination. The location data may also be used to determine if there are any objects, such as persons, behind the crowd gate 20 before starting the reverse movement.

FIG. 4 illustrates animals located in a holding area 30 with a moveable crowd gate 20, according to a first example scenario. In this example scenario, a person 11 is located in the holding area 30. The crowd gate 20 is then controlled to stop or reverse its movement in response to detecting that the person 11, who is wearing a special RTLS tag, is close to (within a predetermined distance of) the crowd gate 20. Alternatively, the crowd gate 20 may be controlled to stop the crowd gate 20 and give a system alert if an animal 10 is lying down in front of it (in relation to direction of the entrance) with no attempt to stand up. The RTLS tag 51 can supply this kind of information, for example if it has an accelerometer.

Figure 5:
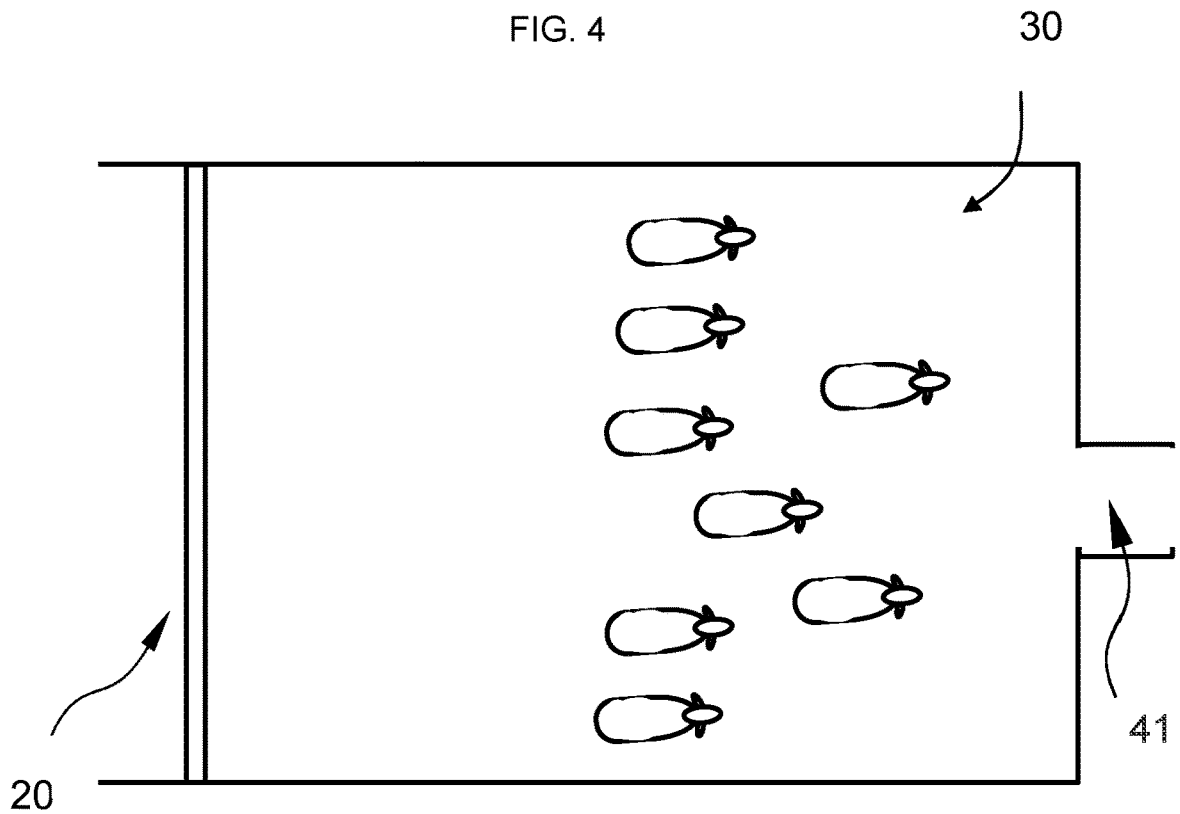
FIG. 5 illustrates a second example scenario where animals are located in a holding area with a moveable crowd gate.

FIG. 5 illustrates animals located in a holding area 30 with a moveable crowd gate 20, according to a second example scenario. In this example scenario, there are no animals 10 right in front of the crowd gate 20. Hence, the crowd gate 20 can move firmly (that is with constant speed) with a moderate or high speed until it approaches animals 10 located closer to the destination 40.

Figure 6:
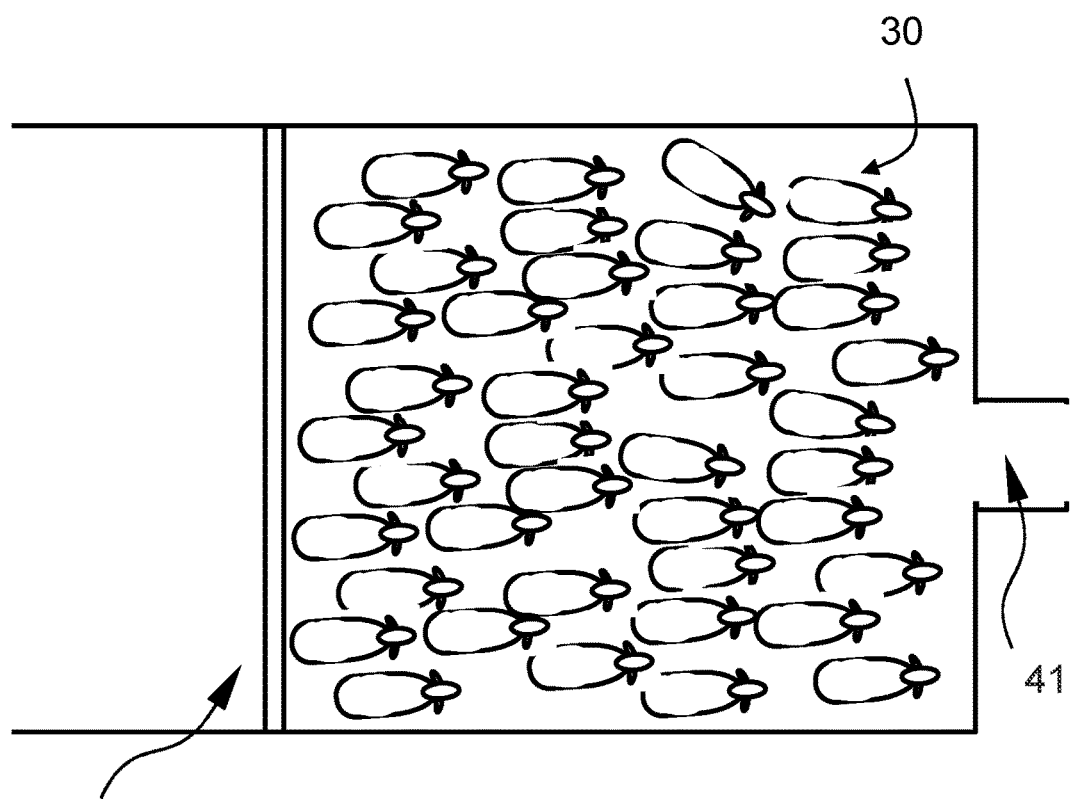
FIG. 6 illustrates a third example scenario where animals are located in a holding area with a moveable crowd gate.

FIG. 6 illustrates animals located in a holding area 30 with a moveable crowd gate 20, according to a third example scenario. In this example scenario, the holding area 30 is extremely dense (for example density is above a threshold). Thus, there may not be a need to move the crowd gate 20 at all, or it shall be moved very gently, that is with a very low speed.

Figure 7:
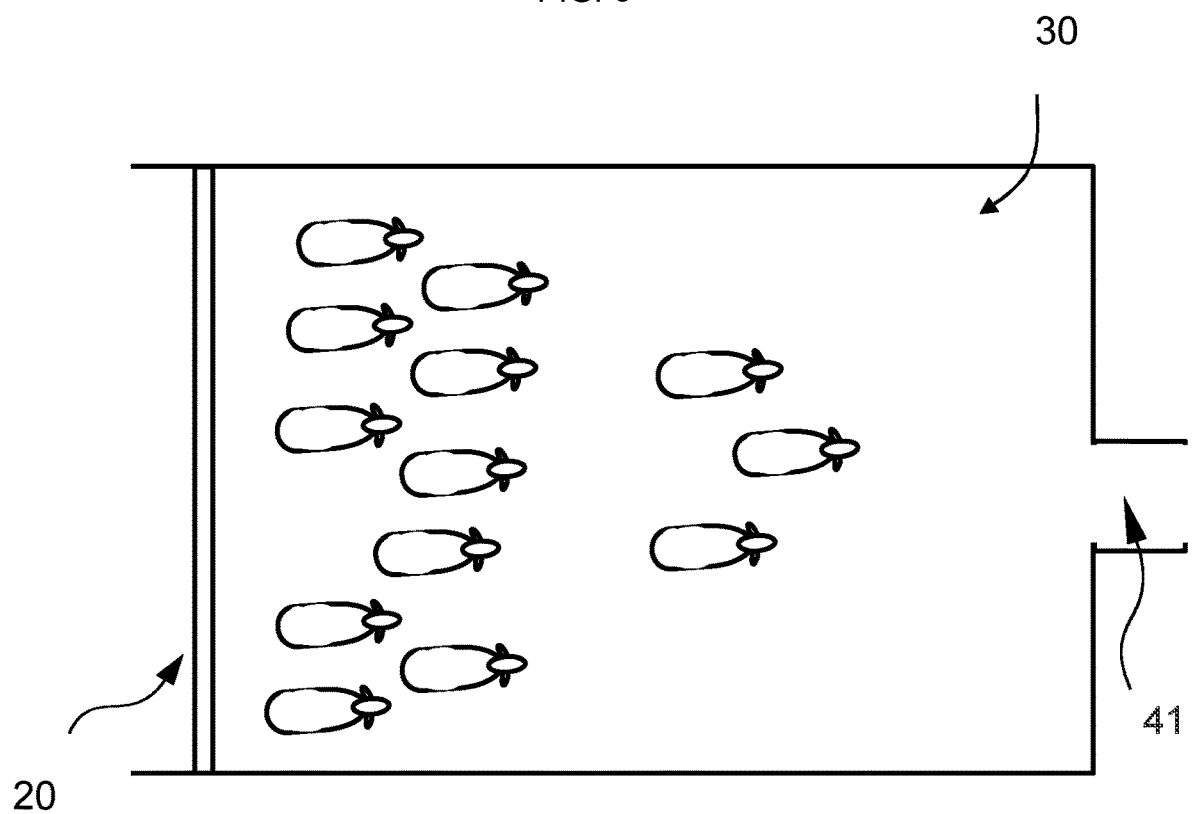
FIG. 7 illustrates a fourth example scenario where animals are located in a holding area with a moveable crowd gate.

FIG. 7 illustrates an example where animals 10 are located in a holding area 30 with a moveable crowd gate 20, according to a fourth example scenario. In this example, there is free space right in front of the destination 40, but a group of animals 10 are located just in front of the crowd gate 20. The crowd gate 20 may then be controlled to move semi-firmly with small pushes. In other words, the crowd gate 20 is controlled to move with a periodic speed pattern. For example, the crowd gate moves with s first speed for a short period of time and is thereafter still for a period of time. Such a movement will force the group of animals to move forward and at the same time leave time for animals 10 in the front of the group to move in order to provide space for animals 10 behind, as the animals 10 in the last row (close to the crowd gate 20) may be prevented from moving by the animals 10 standing right in front of them. Also, the animals might want to reposition, wait for each other, wait for a certain cow or readjust their order, which requires some time and space. In some embodiments the crowd gate 20 is moved in sequence with a warning signal, such as a bell, transmitted by the warning arrangement 43.

Figure 8:
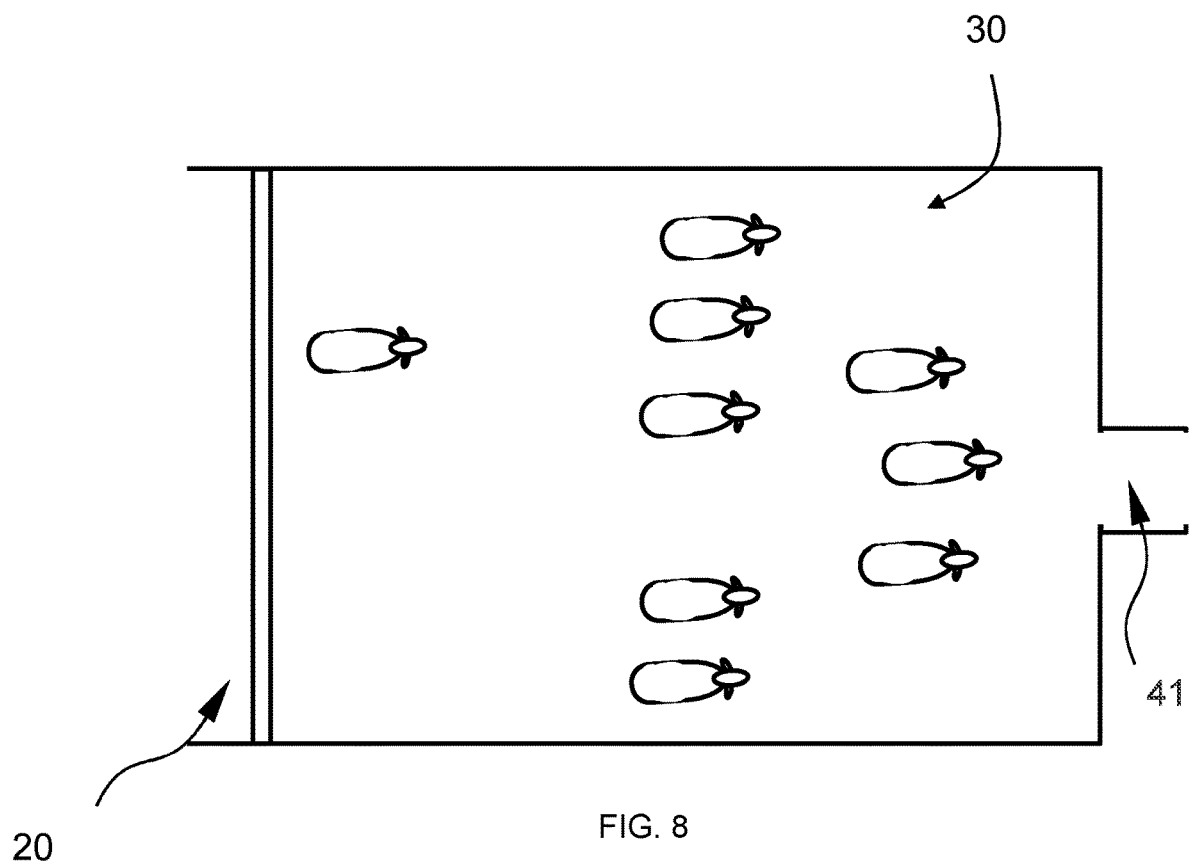
FIG. 8 illustrates a fifth example scenario where animals are located in a holding area with a moveable crowd gate.

FIG. 8 illustrates animals 10 located in a holding area 30 with a moveable crowd gate 20, according to a fifth example scenario. In this example scenario, there is just one single animal 10 right in front of the crowd gate 20 with a lot of space in front of it. In this case the crowd gate 20 may be controlled to be moved firmly with moderate speed (possibly in sequence with a bell) with a constant movement pattern, as there are no other animals that are hindering the animal 10 from moving.

Figure 9:
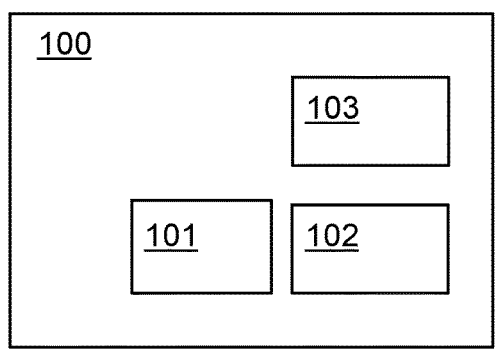
FIG. 9 illustrates a control unit according to the second aspect.

FIG. 9 illustrates the control unit 100 in more detail. The control unit 10 should be considered as a functional unit, which may be implemented by one or several physical units. In other words, the control unit is in some embodiments a control arrangement. The control unit 100 comprises hardware and software. The hardware is for example various electronic components on a for example a Printed Circuit Board, PCB. The most important of those components is typically a processor 101 for example a microprocessor, along with a memory 102 for example EPROM or a Flash memory chip. The software (also called firmware) is typically lower-level software code that runs in the microcontroller. The control unit 100 comprises a communication interface, for example I/O interface or other communication bus, for communicating with the RTLS 50.

The control unit 100, or more specifically a processor 101 of the control unit 100, is configured to perform all aspects of the method described in FIG. 3. This is typically done by running computer program code stored in the memory 102, in the processor 101 of the control unit 100. Hence, the control unit 100 is configured to control the automated crowd gate 20.

More particularly, the control unit 100 is configured to obtain, from a real-time location system 50, location data defining individual positions of one or more animals 10 located in the holding area 30.

The control unit 100 is also configured to obtain a current position of the crowd gate 20 and to control an operation associated with the crowd gate 20 (using the actuator 21 and warning arrangement 43, based on the obtained position of the crowd gate 20 and the location data.

In some embodiments, the control unit 100 is configured to control a movement of the crowd gate 20 and/or transmission of a warning signal that is perceivable to one or more of the animals 10 in the holding area 30.

In some embodiments, the control unit 100 is configured to control a speed or a speed pattern of the movement of the crowd gate 20.

In some embodiments, the control unit 100 is configured to determine, based on the location data, a count of animals 10 located within a distance d1 of the crowd gate 20 and/or within a distance d2 of the entrance 41 and to control the operation based on the determined count of animals 10 located within a distance d1 of the crowd gate 20 and/or within a distance d2 of the entrance.

In some embodiments, the control unit 100 is configured to reduce, reverse or stop the movement of the crowd gate 20 upon determining, using the a real-time location system 50, presence of a human, or an animal 10 having a certain level of stationarity, in the holding area 30 or within a distance d1 of the crowd gate 20.

In some embodiments, the control unit 100 is configured to control transmission of the warning signal such that, before an animal is hit by the crowd gate 20, a warning signal perceivable to the animal 10 is transmitted.

In some embodiments, the control unit 100 is configured to determine, based on the location data, a distribution of animals within the holding area 30 and/or a density of animals within a part of the holding area 30, and to control the operation associated with the crowd gate 20 based on the determined distribution or density.

In some embodiments, the control unit 100 is configured to control the crowd gate 20 to move with a lower speed if the determined density of animals is above a first value, than if it being below the first density value.

In some embodiments, the control unit 100 is configured to cause the crowd gate to refrain from moving upon the determined density meeting a second density value.

In some embodiments, the control unit 100 is configured to control the operation associated with the crowd gate 20 such that there is always a certain count of animals 10 within a distance d2 of the entrance 41.

In some embodiments, the control unit 100 is configured to determine, based on the location data, a movement of one or more of the animals 10 in the holding area 30, and to control the operation associated with the crowd gate 20 based on the determined movement.

In some embodiments, the control unit 100 is configured to control the operation associated with the crowd gate 20 to a default position upon determining, based on the location data, that the count of the animals 10 in the holding area 30 is below a threshold.

In some embodiments, the control unit 100 is configured to cease transmission of the warning signal upon the determined movement corresponding to a desired movement.

In some embodiments, the control unit 100 is configured to control the operation associated with the crowd gate 20 using one or more rules, which are configurable, settable or predefined.

The terminology used in the description of the embodiments as illustrated in the accompanying drawings is not intended to be limiting of the described method; control unit or computer program. Various changes, substitutions and/or alterations may be made, without departing from disclosure embodiments as defined by the appended claims.

The term "or" as used herein, is to be interpreted as a mathematical OR, that is, as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as for example a processor may fulfil the functions of several items recited in the claims.

The invention claimed is:

1. A method for controlling an automated crowd gate (20) operable to form a side of a holding area (30) and to move in relation to an entrance (41) of a destination (40), in order to cause animals (10) located in the holding area (30) to move towards the destination (40), the animals having active tags that transmit signals usable to determine each animal's location within the holding area (30), the method comprising:
- obtaining (S1), from a real-time location system (50) comprising plural readers that receive the signals transmitted by the active tags, location data defining real-time individual positions of all the animals (10) located in the holding area (30);
- obtaining (S2) a current position of the crowd gate (20) moving from a starting position in a first direction (25) towards the entrance (41) of the destination (40), the current position including all intermediate positions between the starting position and the entrance (41) of the destination (40);
- controlling (S5) an operation associated with the crowd gate (20), based on the obtained current position of the crowd gate (20) and the location data, the obtained current position including all the intermediate positions; and
- determining (S3a), based on the location data, a count of animals (10) located within a distance (d1) of the crowd gate (20) and/or within a distance (d2) of the entrance (41),
- wherein the controlling (S5) comprises controlling (S5a) the operation associated with the crowd gate (20) based on the determined count of animals (10) located within a distance (d1) of the crowd gate (20) and/or within a distance (d2) of the entrance.

2. The method according to claim 1, wherein the controlling (S5) comprises at least one of controlling a movement of the crowd gate (20) and controlling transmission of a warning signal that is perceivable to one or more of the animals (10) in the holding area (30).

3. The method according to claim 2, wherein the controlling (S5) comprises controlling a speed or a speed pattern of the movement of the crowd gate (20).

4. The method according to claim 1, wherein the location data comprises information of at least one of stationarity, movement, acceleration, and direction of movement of the individual animals (10).

5. The method according to claim 1, wherein the controlling (S5) comprises any of reducing, reversing, and stopping the movement of the crowd gate (20) upon determining, by use of the real-time location system (50), presence of a human and/or an animal (10) having a level of stationarity, either in the holding area (30) or within a distance (d1) of the crowd gate (20).

6. The method according to claim 2, wherein the controlling (S5) comprises controlling transmission of the warning signal such that the warning signal perceivable to the animal (10) is transmitted before the animal is hit by the crowd gate (20).

7. The method according to claim 1, further comprising:
- determining (S3b), based on the location data, at least one of a distribution of animals within the holding area (30) and a density of animals within a part of the holding area (30),
- wherein the controlling comprises controlling (S5b) the operation associated with the crowd gate (20) based on the determined distribution or density.

8. The method according to claim 7, wherein the controlling (S5) comprises controlling the crowd gate (20) to move with a lower speed if the determined density of animals is above a first density value, and at a higher speed if the determined density of animals is below the first density value.

9. The method according to claim 7, wherein the controlling (S5) comprises refraining from moving the crowd gate (20) upon the determined density meeting a second density value.

10. The method according to claim 1, wherein the controlling (S5) comprises operating the crowd gate (20) such that there is always a certain count of animals (10) located within a distance (d2) of the entrance (41).

11. The method according to claim 2, further comprising:
- determining (S4), based on the location data, a movement of one or more of the animals (10) in the holding area (30),
- wherein the controlling comprises controlling (S5c) the operation associated with the crowd gate (20) based on the determined movement.

12. The method according to claim 11, wherein the controlling (S5) comprises ceasing to transmit the warning signal upon the determined movement corresponding to a desired movement.

13. The method according to claim 1, wherein the controlling (S5) comprises operating the crowd gate (20) to a default position upon determining, based on the location data, that the count of the animals (10) in the holding area (30) is below a threshold.

14. The method according to claim 2, wherein the warning signal is a visible signal, an audio signal, a vibration signal, an electrical signal, or a tactile signal.

15. The method according to claim 1, wherein the controlling (S5) comprises controlling the operation associated with the crowd gate (20) using one or more rules, which are settable, configurable or predefined.

16. A non-transitory computer-readable medium having instructions recorded thereon which, when executed by a processor of a computer, cause the computer to carry out the method according to claim 1.

17. A control arrangement (100) for controlling an automated crowd gate (20), the crowd gate (20) being operable to form a side of a holding area (30) and to move in relation to an entrance (41) of a destination (40), in order to cause animals (10) located in the holding area (30) to move towards the destination (40), the animals having active tags that transmit signals usable to determine each animal's location within the holding area (30), the control arrangement (100) being configured to:
- obtain, from a real-time location system (50) comprising plural readers that receive the signals transmitted by the active tags, location data defining real-time individual positions of all the animals (10) located in the holding area (30); and
- obtain a current position of the crowd gate (20) moving from a starting position in a first direction (25) towards the entrance (41) of the destination (40), the current position including all intermediate positions between the starting position and the entrance (41) of the destination (40); and
- control an operation associated with the crowd gate (20), based on the obtained current position of the crowd gate (20) and the location data, the obtained current position including all the intermediate positions,
- wherein the control arrangement (100) is configured to determine, based on the location data, a count of animals (10) located within a distance (d1) of the crowd gate (20) and/or within a distance (d2) of the entrance (41), and to control the operation associated with the crowd gate (20) based on the determined count of animals (10) located within a distance (d1) of the crowd gate (20) and/or within a distance (d2) of the entrance.

18. The control arrangement (100) according to claim 17, wherein the control arrangement (100) is configured to control at least one of a movement of the crowd gate (20) and transmission of a warning signal that is perceivable to one or more of the animals (10) in the holding area (30).

19. The control arrangement (100) according to claim 17, wherein the control arrangement (100) is configured to control a speed or a speed pattern of the movement of the crowd gate (20).

20. The control arrangement (100) according to claim 17, wherein the location data comprises information of at least one of stationarity, movement, acceleration, and direction of movement of the individual animals (10).

21. The control arrangement (100) according to claim 17, wherein the control arrangement (100) is configured to any of reduce, reverse, and stop the movement of the crowd gate (20) upon determining, by use of the real-time location system (50), presence of any of a human and an animal (10) having a certain level of stationarity, either in the holding area (30) or within a distance (d1) of the crowd gate (20).

22. The control arrangement (100) according to claim 17, wherein the control arrangement (100) is configured to control transmission of the warning signal such that the warning signal perceivable to the animal (10) is transmitted before the animal is hit by the crowd gate (20).

23. The control arrangement (100) according to claim 17, wherein the control arrangement (100) is configured to determine, based on the location data, at least one of a distribution of animals within the holding area (30) and a density of animals within a part of the holding area (30), and to control the operation associated with the crowd gate (20) based on the determined distribution or density.

24. The control arrangement (100) according to claim 23, wherein the control arrangement (100) is configured to control the crowd gate (20) to move with a lower speed if the determined density of animals is above a first density value, and at a higher speed if the determined density of animals is below the first density value.

25. The control arrangement (100) according to claim 23, wherein the control arrangement (100) is configured to cause the crowd gate to refrain from moving upon the determined density meeting a second density value.

26. The control arrangement (100) according to claim 17, wherein the control arrangement (100) is configured to control the operation associated with the crowd gate (20) such that there is always a certain count of animals (10) located within a distance (d2) of the entrance (41).

27. The control arrangement (100) according to claim 17, wherein the control arrangement (100) is configured
to determine, based on the location data, a movement of one or more of the animals (10) in the holding area (30), and
to control the operation associated with the crowd gate (20) based on the determined movement.

28. The control arrangement (100) according to claim 17, wherein the control arrangement (100) is configured to control the operation associated with the crowd gate (20) to a default position upon determining, based on the location data, that the count of the animals (10) in the holding area (30) is below a threshold.

29. The control arrangement (100) according to claim 17, wherein the control arrangement (100) is configured to cease transmission of the warning signal upon the determined movement corresponding to a desired movement.

30. The control arrangement (100) according to claim 17, wherein the warning signal is a visible signal, an audio signal, a vibration signal, an electrical signal, or a tactile signal.

31. The control arrangement (100) according to claim 17, wherein the control arrangement (100) is configured to control the operation associated with the crowd gate (20) using one or more rules, which are configurable, settable or predefined.

32. The method according to claim 1, wherein said real-time location system (50) uses a multi-lateration technique with the signals transmitted by the active tags to track the real-time individual positions of the animals (10) as a two-dimensional position or a three-dimension position in the holding area (30).

33. The method according to claim 1, wherein said real-time location system (50) uses triangulation of data with the signals transmitted by the active tags to track the real-time individual positions of the animals (10) in the holding area (30).

* * * * *